No. 620,573. Patented Mar. 7, 1899.
G. W. DONNING.
CAR FENDER.
(Application filed Dec. 4, 1897.)
(No Model.)
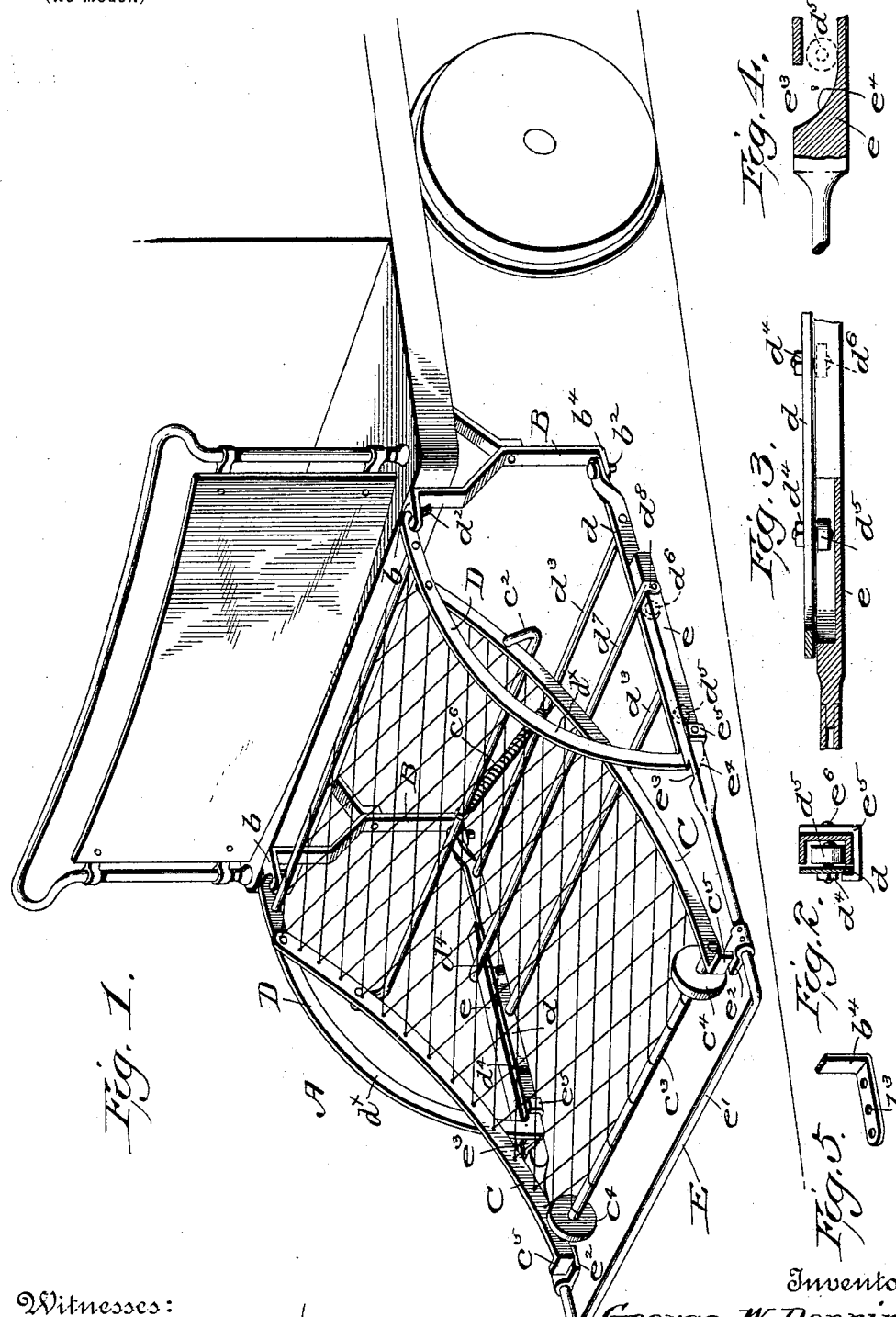
Witnesses:
Albert Spidew.
R. McElliott.
Inventor:
George W. Donning,
by R. S. Dyrenforth,
his attorney.
THE NORRIS PETERS CO., PHOTO-LITHO., WASHINGTON, D. C.

UNITED STATES PATENT OFFICE.

GEORGE W. DONNING, OF NEW YORK, N. Y.

CAR-FENDER.

SPECIFICATION forming part of Letters Patent No. 620,573, dated March 7, 1899.

Application filed December 4, 1897. Serial No. 660,803. (No model.)

*To all whom it may concern:*

Be it known that I, GEORGE W. DONNING, a citizen of the United States, residing at New York, (Brooklyn,) in the county of Kings and State of New York, have invented certain new and useful Improvements in Car-Fenders; and I do hereby declare the following to be a full, clear, and exact description of the invention, such as will enable others skilled in the art to which it appertains to make and use the same.

This invention relates to street-car fenders.

The object is to produce a fender which will in operation effectually prevent injury to a person struck by it or falling upon it, in which the scoop or pick-up portion will be brought automatically into position for use through the agency of the body or obstruction struck, in which the scoop or pick-up portion will be prevented from lifting by the weight of a contained body, and which will combine great simplicity of construction with high efficiency and durability in use and cheapness of production.

In a car-fender characterized by my invention, generally stated, I provide a guard-frame adapted to be detachably connected to a car, so as to permit transference to either end thereof. This frame may be of any preferred construction and of any suitable material combining lightness and strength. Pivotally connected with the guard-frame, at or near the rear thereof and between its sides, is a scoop or fender-frame, the connection being such as to allow it to operate or move freely between the sides of the guard-frame. The fender-frame comprises side pieces connected by suitable cross-bars, one of which, preferably the one located near the rear of the frame, is bent or dropped to allow the rope net to yield when a body drops upon it, and also to obviate injury to the body caught by the net, the front cross-bar being provided with rollers or wheels adapted to contact with the car-rails when the fender-frame is dropped, and thereby keep the frame from striking the ground. This fender-frame is held normally out of operative position with relation to the ground by a suitable trigger-frame, the bend whereof projects beyond the forward end of the fender-frame and may be covered to present a soft surface to the body struck. The trigger-frame has a sliding connection with the guard-frame, so that upon contact with a body it will move rearward, thereby to release the fender-frame and allow the same to drop to operative position. The fender-frame may drop by its own weight or may be spring-pulled or spring-pressed, and to this latter end I have shown in this instance a spring connected with a cross-bar of the guard-frame and with the fender-frame, the spring or springs, as I may employ one or more, also subserving the further function of holding the outer end of the fender-frame in engagement with the trigger-frame until the former is released; but it is to be understood that I may in some instances weight the outer end of the fender-frame and cause this weight to subserve the same function as the spring or springs and also guard against any rearward movement of the trigger-frame and consequent inopportune release of the fender-frame due to vibrations when a car is in transit, and more particularly when traveling up-hill.

Further and more specific details of construction will be hereinafter more fully described.

In the accompanying drawings, forming a part of this specification and in which like letters of reference indicate corresponding parts, I have illustrated one form of embodiment of my invention, although it is to be understood that other forms of embodiment thereof may be employed without departing from the spirit of the same.

In the drawings, Figure 1 is a view in perspective, showing the fender attached to the dashboard of a car and in position to be released for the purpose of picking up a body. Fig. 2 is a view in transverse section through a portion of the trigger-frame, showing the manner in which it is supported for operation. Fig. 3 is a detail view, partly in section, of a portion of the trigger-frame. Fig. 4 is a view in elevation, partly in section, of a part of the trigger-frame, showing the means by which release of the trigger-frame is effected when the latter has reached the limit of its rearward movement; and Fig. 5 is a view in perspective of the lower portion of one of the supporting-brackets.

Referring to the drawings, A designates the fender, supported in this instance from brackets B, secured to the front and rear of the car. The form of connection between the fender and the car herein shown is one of many which may be employed, and it is to be understood for this reason that I do not confine myself to this particular form of assemblage.

The fender consists generally of a fender-frame, a hanger-frame, and a trigger-frame. The fender-frame comprises two side bars C, in this instance shown curved downward, the same being connected by cross-rods $c^2$ $c^3$, the function of these rods being to hold the side bars properly assembled. The rear cross-rod $c^2$ has its ends bent at right angles to the length of the rod and inserted from the outer side of the bars through openings in the same to the inner sides thereof, and these ends are upset or otherwise secured in place. The front rod $c^3$ carries two rollers $c^4$, adapted when the fender-frame drops to run along the car-track, and thereby prevent contact between the frame and road-bed. The rear ends of these side bars are pivotally connected with the hanger-frame D, the same comprising two outward-curved top members $d^\times$ and two straight base members $d$, the rear ends of the top members $d^\times$ being bent or provided with pintles $d^2$ for engaging offsets $b$ of the brackets B, and the rear ends of the members $d$ being in this instance bent at right angles to the length of the members $d^\times$ to present flat surfaces, through which will be inserted pins $b^2$, passing through openings $b^3$ in toes or projections $b^4$ of the hangers B, and by this arrangement the hanger-frame may be readily and securely attached to a car. The toes $b^4$ may be provided with a plurality of openings $b^3$, as shown in Fig. 5, in order to adjust the tilt of the fender with relation to the road-bed, so as to prevent rearward movement of the trigger-frame, as from vibrations of the car, and consequent inopportune release of the said frame; but it is to be understood that I do not limit myself to this particular arrangement to effect adjustment of the fender for the purpose stated. The members $d$ are connected by cross-bars $d^3$, which serve to hold these parts securely together. Upon the members $d^\times$ and projecting outward therefrom on each side of the fender are two or more projections, which may be either pintles or bolts $d^4$, carrying guide-rollers $d^5$ $d^6$, and these rollers are adapted to work in the rear portion of the side arms $e$ of the trigger-frame E, which arms are in this instance made of channel-iron, while the front bend $e'$ of the trigger-frame is made of round iron tubing. By employing the channel-irons and rollers the trigger-frame will move easily and without danger of binding and will be properly guided to do effective work.

While I have shown the side arms of the trigger-frame as constructed of channel-iron, it is to be understood that I do not wish to be confined to their use alone, as other means may be adopted for supporting and guiding the trigger-frame other than that shown.

At a point near the front bend $e'$ of the trigger-frame there are provided two inward-extending toes or projections $e^2$, which may be either integral with the side members of the trigger-frame or secured thereto, and these projections are adapted to be engaged by outward-extending toes or projections $c^5$, formed on or carried by the forward ends of the side bars of the fender-frame. When the parts are in position for use, as shown in Fig. 1, the toes will rest upon the projections; but as soon as an object is struck by the front bend of the trigger-frame this frame will move backward, and thereby release the toes from engagement with the projections, when the fender-frame will drop, the object struck causing the trigger-frame to continue to move backward after the fender-frame has dropped and also to drop and rest on the fender-frame. To permit the trigger-frame to drop as described, the upper face of each channel-arm is provided with a slot $e^3$, through which the two front wheels or rollers $d^5$ will pass, the two rear wheels $d^6$ serving as pivots, about which the trigger-frame will rock, and when the trigger-frame drops its front bend $e'$ will pass back of the rollers $c^4$, and thereby prevent the fender-frame from lifting. Below each slot $e^3$ is arranged an inclined or wedge-shaped surface $e^4$, which may be in the nature of a separate piece of metal secured within the channel-arm or be formed by dressing or shaping down the ends of the channel-arms where they are secured in the tubular portion of the trigger-frame, the function of these inclined surfaces being to guide the rollers $d^5$ toward the slot $e^3$ when the trigger-frame is struck, and thereby obviate all danger of the trigger-frame remaining in its normal or raised position. To cause the toes $c^5$ to rest with comparative firmness on the projections $e^2$, I connect the cross-rod $c^2$ with the cross-rod $d^3$ by means of a spring $c^6$; but the tension of this spring will not in any way interfere with the ease of working of the trigger-frame.

It may be found that when a car is running rapidly on a comparatively level stretch or is ascending a steep grade the vibrations of the car may cause the trigger-frame to move rearward, and thereby release the fender-frame at inopportune times, and in order to obviate this difficulty I may employ devices of various kinds for preventing this retrograde movement, one manner herein shown being to tilt or incline the lower members $d$ of the hanger-frame toward the road-bed. The angle of this tilt will be just sufficient for the purpose designed and will not interfere with the proper working of the trigger-frame when struck by an object. In order, further, to guide the trigger-frame in its rearward movement, I may employ on each side of the fender-frame an L-shaped guide $e^5$, the outer members of which may be secured to the channel-arms, as by bolts $e^6$, the inner ends being extended inward and embrace the lower members $d$ of the hanger-frame, and by these guides the fender-frame is also still further prevented from spreading when in use.

To hold the rear portion of the channel-arms in operative position with relation to the base members $d$ of the hanger-frame and also to prevent any spreading or springing of these channel-arms, I employ a brace $d^7$, having its ends bent to form toes $d^8$, which are bolted or otherwise secured to the channel-arms near their rear ends.

Having thus fully described my invention, what I claim as new, and desire to secure by Letters Patent of the United States, is—

1. A car-fender comprising a hanger-frame adapted to be connected with a car, a fender-frame pivotally connected with the hanger-frame, a trigger-frame for supporting the fender-frame in position for use, said trigger-frame being adapted for rearward movement, when struck by an object, to release the fender-frame and lock it from lifting, substantially as described.

2. A car-fender comprising a hanger-frame adapted to be connected with a car, a fender-frame pivotally connected with the hanger-frame and carrying rollers at its free end, a trigger-frame supporting the free end of the fender-frame and having a sliding connection with the hanger-frame, and guide-rollers supporting the rear portion of the trigger-frame, substantially as described.

3. A car-fender comprising a hanger-frame detachably connected with a car, a fender-frame pivotally connected with the hanger-frame, the outer ends of the members of the fender-frame being provided with toes, cross-bars connecting the members of the fender-frame, a trigger-frame having a sliding connection with the hanger-frame, projections on the trigger-frame to be engaged by the toes of the fender-frame, for holding the same in operative position, and a spring connecting the hanger-frame and the fender-frame, whereby the toes of the latter will be held in position upon the projections of the trigger-frame against accidental release therefrom, due to jars and the like, substantially as described.

4. A car-fender comprising a hanger-frame detachably connected with a car, a fender-frame pivotally connected with the hanger-frame, the outer ends of the members of the fender-frame being provided with toes, cross-bars connecting the members of the fender-frame, a trigger-frame having a sliding connection with the hanger-frame, projections on the trigger-frame to be engaged by the toes of the fender-frame for holding the same in operative position, a spring connecting the hanger-frame and the fender-frame, whereby the toes of the latter will be held in position upon the projections of the trigger-frame against accidental release therefrom, due to jars and the like, and guide-rollers supporting the rear portion of the trigger-frame, substantially as described.

5. A car-fender comprising a hanger-frame adapted to be connected with a car, a fender-frame pivotally connected with the hanger-frame, and carrying rollers at its free end, a trigger-frame supporting the free end of the fender-frame, the side arms of the trigger-frame being channeled, and rollers carried by the hanger-frame and working in the channeled arms of the trigger-frame, substantially as described.

6. A car-fender comprising a hanger-frame adapted to be connected with a car, a fender-frame pivotally connected with the hanger-frame, and carrying rollers at its outer free end, a trigger-frame supporting the free end of the fender-frame, the side arms of the trigger-frame being each channeled, and provided at its forward upper portion with a slot or opening, the end walls of the said channels, adjacent to the slots, being inclined, and rollers carried by the hanger-frame, the front roller, on each side of the hanger-frame, being adapted to pass out of the said slot when the trigger-frame is moved rearward, whereby to allow the trigger-frame to drop over the fender-frame, substantially as and for the purpose specified.

7. A car-fender comprising a hanger-frame consisting of downward-curved top members and straight bottom members, the said members being adapted for detachable connection with a car, cross-rods connecting the members of the hanger-frame, a fender-frame pivoted to the hanger-frame and provided with suitable netting, rollers carried by the free end of the fender-frame, the sides of the fender-frame in advance of the rollers being bent to present toes, a trigger-frame provided with projections on which the toes of the fender-frame rest, the side members of the trigger-frame being channeled and provided with a slot at their forward portion, guide-rollers carried by the hanger-frame and adapted to work in the said channel members, a brace secured at the rear portion of the channel members, to prevent their separating at this point, and a spring connecting the fender-frame and the hanger-frame, substantially as described.

I testimony whereof I affix my signature in presence of two witnesses.

GEORGE W. DONNING.

Witnesses:
ARMAND T. GIRARD,
EDW. J. BRIDGES.